(12) United States Patent
Tatsuzue

(10) Patent No.: US 9,891,574 B2
(45) Date of Patent: Feb. 13, 2018

(54) HIGH-VOLTAGE POWER SUPPLY APPARATUS AND IMAGE FORMING APPARATUS

(71) Applicant: CANON KABUSHIKI KAISHA, Tokyo (JP)

(72) Inventor: Akira Tatsuzue, Ageo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/213,001

(22) Filed: Jul. 18, 2016

(65) Prior Publication Data

US 2017/0023903 A1 Jan. 26, 2017

(30) Foreign Application Priority Data

Jul. 21, 2015 (JP) ................................. 2015-144360

(51) Int. Cl.
*G03G 15/00* (2006.01)
*G03G 15/16* (2006.01)
*H02M 7/10* (2006.01)
*H02M 1/00* (2006.01)

(52) U.S. Cl.
CPC ......... *G03G 15/80* (2013.01); *G03G 15/1675* (2013.01); *G03G 15/5004* (2013.01); *H02M 7/10* (2013.01); *H02M 2001/0009* (2013.01)

(58) Field of Classification Search
CPC ............... G03G 15/80; G03G 15/1675; G03G 15/5004; H02M 7/10; H02M 2001/0009

USPC ..................................................... 399/66, 88
See application file for complete search history.

(56) References Cited

U.S. PATENT DOCUMENTS

| 6,026,257 | A | 2/2000 | Takami et al. | |
|---|---|---|---|---|
| 6,243,544 | B1* | 6/2001 | Tsuneeda | G03G 15/1675 399/101 |
| 2006/0198650 | A1* | 9/2006 | Nakaso | G03G 15/1675 399/66 |
| 2014/0016956 | A1* | 1/2014 | Terasaki | G03G 15/1675 399/66 |
| 2015/0063855 | A1 | 3/2015 | Nagasaki et al. | |

FOREIGN PATENT DOCUMENTS

| JP | H07181814 A | 7/1995 |
|---|---|---|
| JP | 2006220976 A | 8/2006 |

* cited by examiner

*Primary Examiner* — Sandra Brase
(74) *Attorney, Agent, or Firm* — Canon U.S.A., Inc. IP Division

(57) ABSTRACT

A high-voltage power supply that outputs high voltages having a predetermined polarity and a reverse polarity performs control in a manner that, during a transition period in which switching of a target voltage of the high voltage having the reverse polarity from the predetermined polarity is performed, a setting value in accordance with a voltage higher than a target voltage is set as the voltage having the reverse polarity, and then a setting value in accordance with the target voltage is set as the voltage having the reverse polarity.

12 Claims, 11 Drawing Sheets

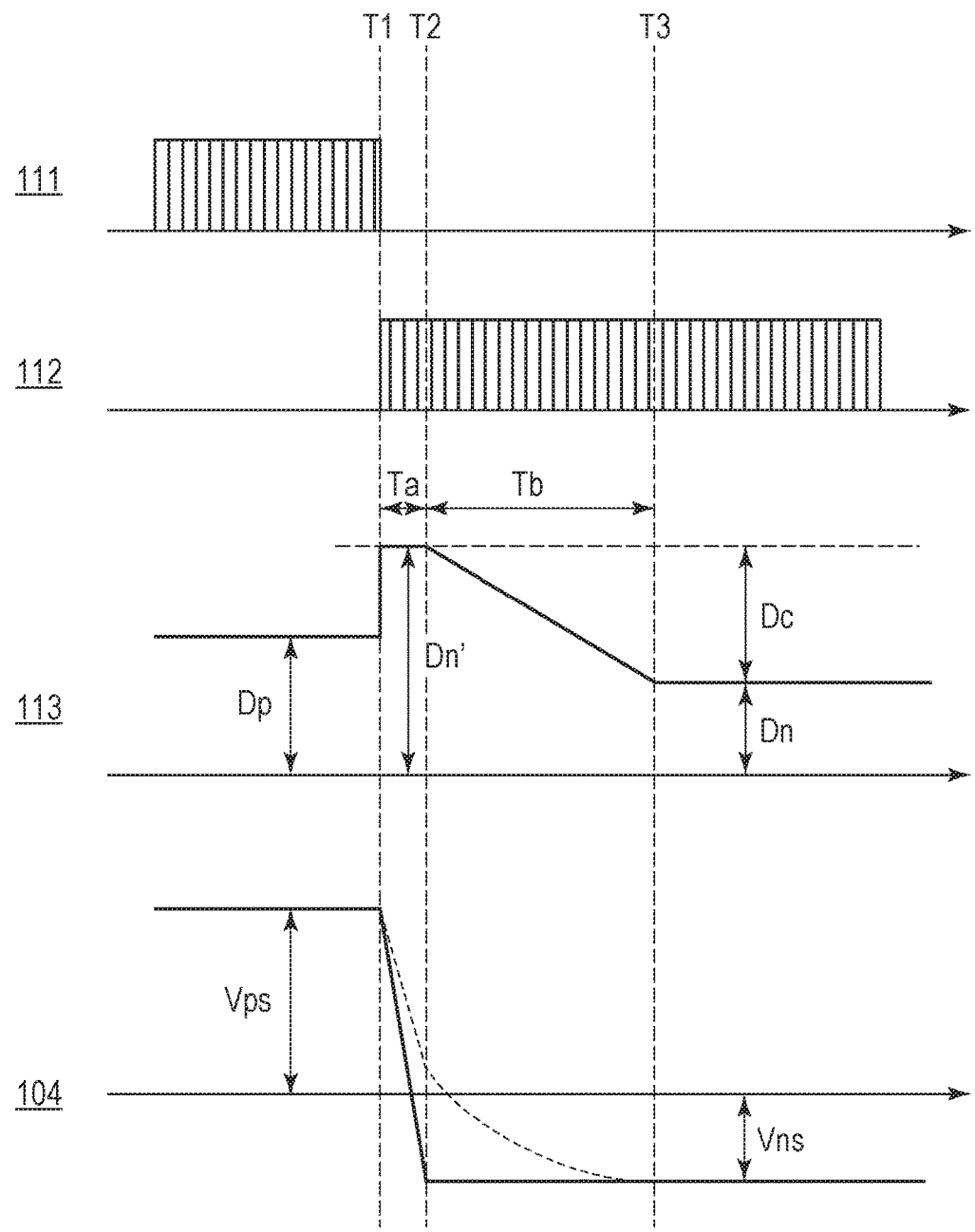

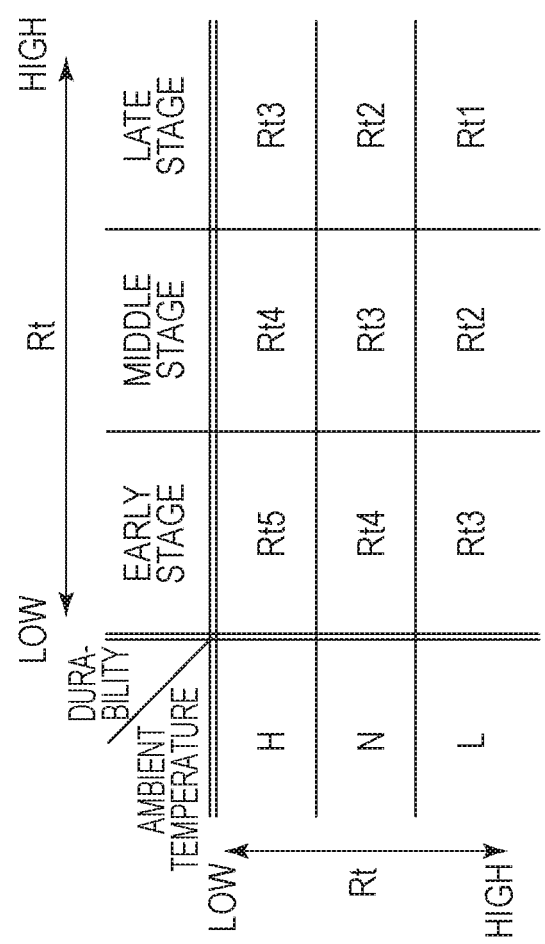

HIGH-VOLTAGE POWER SUPPLY APPARATUS AND IMAGE FORMING APPARATUS

BACKGROUND OF THE INVENTION

Field of the Invention

The present invention relates to a high-voltage power supply apparatus that selectively switches a positive voltage and a negative voltage to be output and an image forming apparatus including the high-voltage power supply apparatus.

Description of the Related Art

A laser beam printer functioning as an image forming apparatus based on an electrophotographic method is provided with a charging apparatus, a developing apparatus, a transfer apparatus, a fixing apparatus, and the like as process members configured to perform image formation. Among the above-described process members, for example, a transfer roller 10 functioning as the transfer apparatus is selectively applied with voltages of both positive and negative polarities (which will be also referred to as a transfer bias). Japanese Patent Laid-Open No. 2006-220976 describes the following configuration. When a recording material 9 exists in a position where an image is transferred to the recording material 9 (which will be also referred to as a transfer nip portion defined by a photosensitive drum 1 on which a toner image is borne and the transfer roller 10), a transfer process is carried out by performing application of a bias having a polarity reverse to that of toner 7. When the recording material 9 does not exist in the transfer nip portion such as a time of a sheet interval, by performing application of a bias having the same polarity as that of the toner 7, the toner 7 adhered on the transfer roller 10 is cleaned, and also a potential fluctuation (which will be also referred to as a memory on the drum) of an image bearing body (the photosensitive drum 1) is avoided.

When a state in the transfer nip portion is switched from a sheet feeding state in which the recording material 9 is present to a non-sheet feeding state in which the recording material 9 is absent, the transfer bias is switched from the bias having the polarity reverse to that of the toner 7 to a bias having' the same polarity. This switching operation is preferably' performed in a period during which a margin part of a trailing edge of the recording material 9 (portion between an area where the image is formed and the trailing edge of the sheet) passes through the transfer nip portion. In a case where the switching of the transfer bias is not performed in the period corresponding to this margin part, since the transfer bias is not set at a predetermined potential in the non-sheet feeding state, a problem occurs that a potential of the facing photosensitive drum 1 is affected, and a defective image is generated. The period (time period) during which the trailing edge margin part of the recording material 9 passes through the transfer nip is being shortened due to an increase in a conveyance speed to improve a throughput of a product, and the switching time period of the transfer bias is to be shortened.

SUMMARY OF THE INVENTION

Embodiments of the present invention are aimed at shortening a switching time period of polarities of an output voltage by using a simple configuration.

To address the above-described issue, there is provided a high-voltage power supply apparatus according to an aspect of the present invention, including a first high voltage generation unit configured to output a first high voltage having a predetermined polarity, a second high voltage generation unit connected to the first high voltage generation unit and configured to output a second high voltage having a polarity reverse to the polarity of the first high voltage, and a control unit configured to control the first high voltage generation unit and the second high voltage generation unit in a manner that the first high voltage and the second high voltage are selectively output. Further, in the high-voltage power supply apparatus, during a transition period in which a state in which the first high voltage is output is switched to a state in which the second high voltage is output, the control unit sets a setting value in accordance with a voltage higher than a target voltage of the second high voltage as a setting value for outputting the second high voltage and then sets a setting value in accordance with the target voltage as the setting value for outputting the second high voltage.

In addition, there is provided an image forming apparatus according to another aspect of the present invention, including an image forming unit and a high-voltage power supply configured to output a high voltage to the image forming unit, the high-voltage power supply including a first high voltage generation unit configured to output a first high voltage having a predetermined polarity, a second high voltage generation unit connected to the first high voltage generation unit and configured to output a second high voltage having a polarity reverse to the polarity of the first high voltage, and a control unit configured to control the first high voltage generation unit and the second high voltage generation unit in a manner that the first high voltage and the second high voltage are selectively output. Further, in the image forming apparatus, during a transition period in which a state in which the first high voltage is output is switched to a state in which the second high voltage is output, the control unit sets a setting value in accordance with a voltage higher than a target voltage of the second high voltage as a setting value for outputting the second high voltage and then sets a setting value in accordance with the target voltage as the setting value for outputting the second high voltage.

Further features of the present invention will become apparent from the following description of exemplary embodiments with reference to the attached drawings.

BRIEF DESCRIPTION OF THE DRAWINGS

FIG. 5 is a timing chart according to a first exemplary embodiment.

FIGS. 11A and 11B illustrate table information of the load resistance value (Rt), the correction value (Dc), and the period (Tb).

DESCRIPTION OF THE EMBODIMENTS

Hereinafter, several exemplary embodiments to which a technical concept of the present invention is applied will be described with reference to the drawings.

A first exemplary embodiment of the present invention will be described below.

First Exemplary Embodiment

Figure 1:
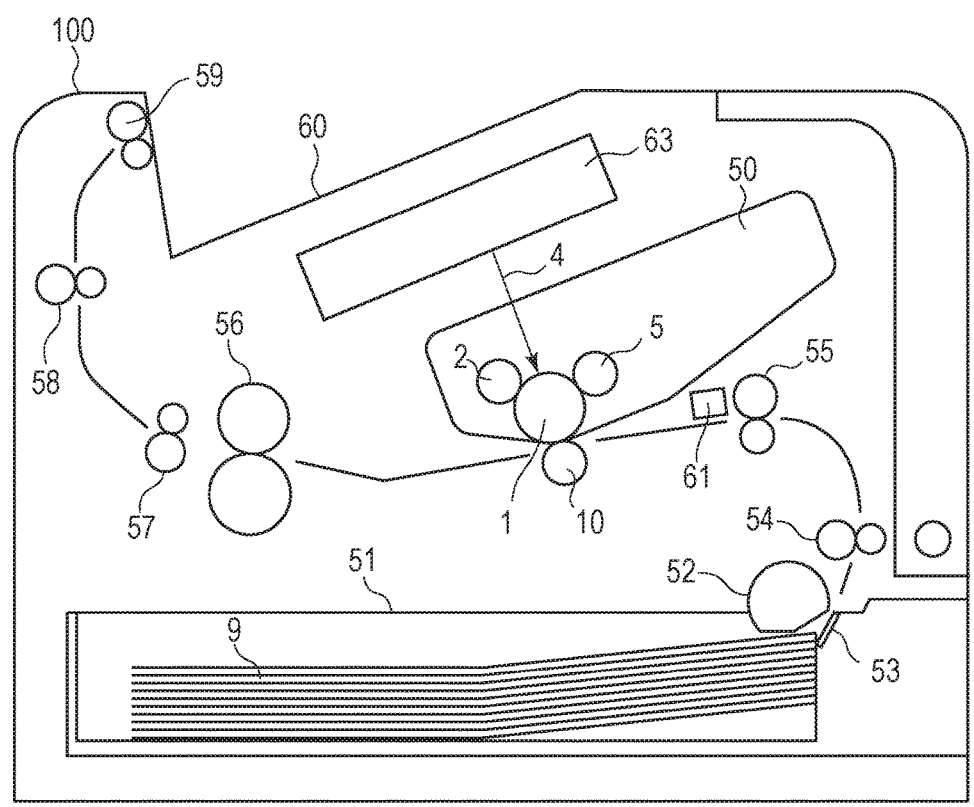
FIG. 1 is a cross sectional view of an image forming apparatus.

FIG. 1 is a cross sectional view of an image forming apparatus 100. A photosensitive member 1 is integrated as a process cartridge 50 to have a configuration to be detachably attached to the image forming apparatus 100. The photosensitive member 1 is an image bearing body that is rotatable by a driving unit such as a motor (not illustrated) and bears a toner image. A charging roller 2 is an example of a charging unit that charges the image bearing body and functions, for example, as a charging member that uniformly charges a surface of the photosensitive member 1. A scanner unit 63 is an example of an exposure unit that exposes the image bearing body uniformly charged by the charging unit with light to form an electrostatic latent image. The scanner unit 63 functions as an exposure unit that irradiates the photosensitive member 1 with laser beam 4 in accordance with image data to form the electrostatic latent image. The development roller 5 is an example of a development unit that develops the electrostatic latent image formed on the image bearing body by using the toner 7 to form the toner image. The development roller 5 functions as a development member that causes the toner 7 to be elected to the photosensitive member 1 to develop the electrostatic latent image into the toner image. Sheets are stacked as the recording materials 9 in a sheet feeding cassette 51. Various sheets such as plain paper, thin paper, heavy paper, OHT sheet, and rough paper can be used as the sheets. The recording materials 9 are fed by a sheet feeding roller 52 and separated by frictional force of a separation pad 53, so that only one of the recording materials 9 is fed to a conveyance roller pair 54. Thereafter, the recording material 9 passes through the conveyance roller pair 54 and a registration roller pair 55 to be conveyed to the transfer nip portion (transfer position) where the photosensitive member 1 abuts against the transfer roller 10. A TOP sensor 61 is a sensor configured to detect the presence or absence of the recording material 9 in a predetermined position in a conveyance path of the sheet and transmit a TOP signal in which a signal level is switched to High or Low on the basis of the presence or absence of the recording material 9 to a CPU 110 which will be described below. The TOP signal is a synchronization signal in a vertical direction (conveyance direction of the recording material 9) for synchronizing a leading edge of the toner image formed on the photosensitive member 1 and a leading edge of the recording material 9 with each other. The TOP signal is used to transfer the image to a predetermined position of the recording material 9. In addition, the TOP signal is used to determine a timing to perform the polarity switching of the transfer bias at a trailing edge of the recording material 9. The transfer roller 10 applied with a predetermined transfer voltage transfers the toner image formed on the photosensitive member 1 to the recording material 9 in the transfer position. A fixing roller pair 56 applies heat and pressure to the toner image to be fused and fixes the toner image onto the recording material 9. The recording material 9 conveyed by the fixing roller pair 56 passes through discharge roller pairs 57, 58, and 59 to be discharged onto a discharge tray 60 and stacked. It should be noted that a configuration may be adopted in which an intermediate transfer body is used as the image forming apparatus 100 or a color image forming apparatus configured to form a multicolor image is used as the image forming apparatus 100. In either case too, since the transfer member that transfer the image to the recording material 9 is used, the exemplary embodiment of the present invention can be applied to the configuration.

Figure 2:
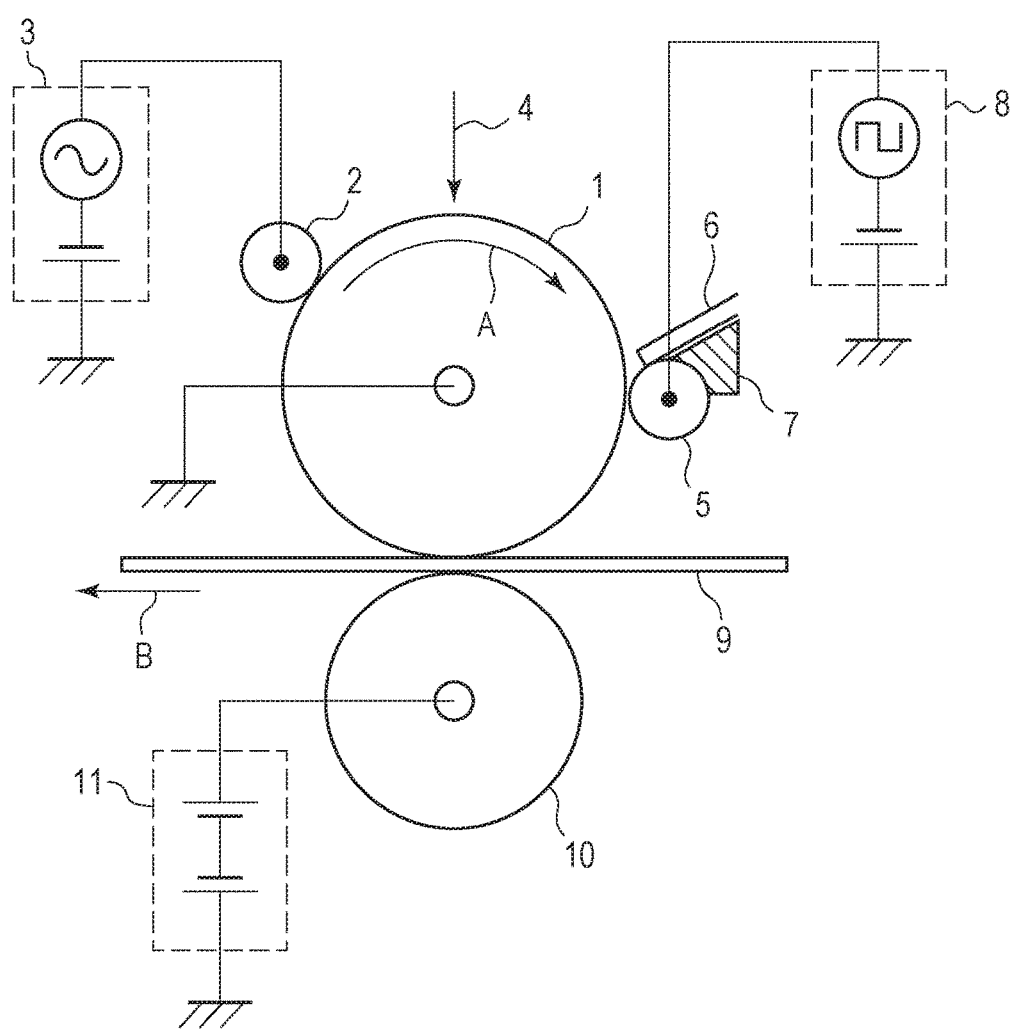
FIG. 2 is a schematic diagram of an image forming process.

FIG. 2 is a schematic diagram of a high-voltage power supply apparatus configured to supply power to members related to an image forming process. In FIG. 2, a charging power supply 3 applies a charging voltage (charging bias) obtained by superimposing an alternating-current (AC) voltage on a direct-current (DC) voltage to the charging roller 2. The photosensitive member 1 is rotated in a direction of an arrow A by a motor (not illustrated). Subsequently, the charging roller 2 is applied with a predetermined voltage, so that a surface potential of the photosensitive member 1 is uniformly charged. A reason why the AC voltage is superimposed in the charging power supply 3 is that the surface potential of the photosensitive member 1 is set to be uniform. Charges of the surface of the photosensitive member 1 are reduced upon irradiation with the laser beam 4, and the electrostatic latent image in accordance with an image signal is formed on the photosensitive member 1. The toner 7 charged to a negative potential is accumulated between the development roller 5 and a development blade 6. An adhesion amount of the toner 7 adhered to the development roller 5 is set to be uniform by the development blade 6, and the toner 7 is conveyed to a gap portion with the photosensitive member 1. A development power supply 8 applies a development voltage obtained by superimposing the AC voltage on the DC voltage to the development roller 5 during the image formation. With the application of this development voltage, an electric field is generated in the gap portion between the photosensitive member 1 and the development roller 5, and the toner 7 adhered to the surface of the development roller 5 is ejected from the development roller 5 to the photosensitive member 1. Herein, a part where the surface of the photosensitive member 1 is not irradiated with the laser beam 4 (which will be also referred to as a non-exposure area) is charged to a negative potential, and a surface potential VD thereof is set to be lower than a DC voltage Vdc of the development power supply 8. For this reason, force acts on the toner 7 in a direction for pushing back towards the development roller 5 in the non-exposure area, and the toner 7 is not ejected to the non-exposure area among the surface of the photosensitive member 1. On the other hand, the negative charges of a surface of a part irradiated with the laser beam 4 (exposure area) among the surface of the photosensitive member 1 are reduced. A potential VL of the exposure area becomes higher than the DC voltage Vdc of the development power supply 8. For this reason, force acts on the toner 7 in a direction for attracting towards the photosensitive member 1 in the exposure area, and the toner 7 is ejected to the exposure area of the photosensitive member 1. The AC voltage of the development power supply 8 is used for a purpose of improving development effects. The toner 7 is caused to perform reciprocal motion by the AC voltage in the gap portion between the photosensitive member 1 and the development roller 5. The voltage having the positive polarity of the AC voltage acts on the toner 7 to be pulled back towards the development roller 5, and the voltage having the negative polarity of the AC voltage acts on the toner 7 to be ejected to the photosensitive member 1. In this manner, the toner image in accordance with the electrostatic latent image formed by the laser beam 4 is formed on the surface of the photosensitive member 1. While the DC voltage Vdc of the development power supply 8 is changed to increase or decrease the amount of the toner 7 ejected to the photosensitive member 1, it is possible to control an image density. The recording material 9 is conveyed in a direction of an arrow B. The transfer roller 10 is applied with the DC voltage having the positive polarity by a transfer power supply 11 during the image formation. The toner image having the negative potential formed on the surface of the photosensitive member 1 is transferred to the recording material 9 by the DC voltage having the positive polarity applied to the transfer roller 10.

Figure 3:
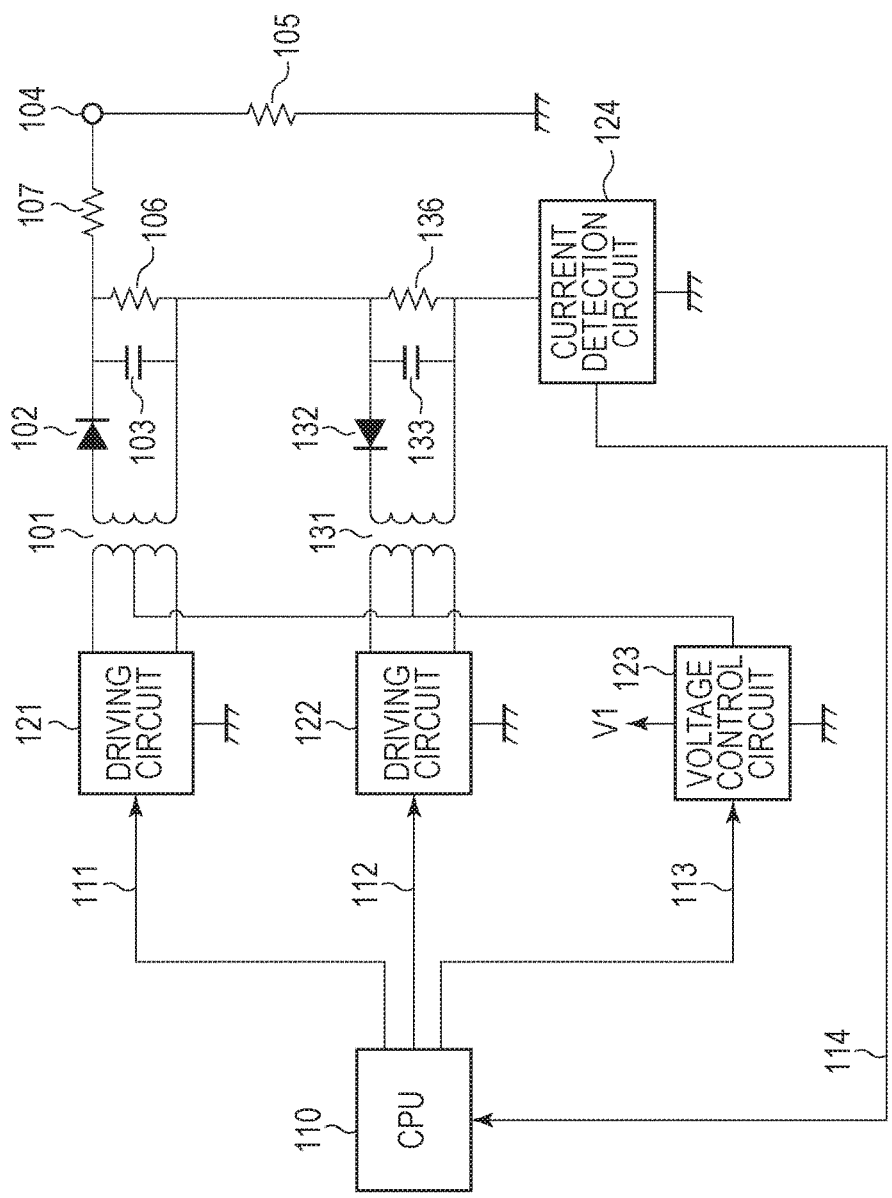
FIG. 3 illustrates an example of a circuit of a transfer power supply.

FIG. 3 is a circuit diagram of the transfer power supply 11 that can selectively generate the voltage having the positive polarity and the voltage having the negative polarity. The CPU 110 has a function of performing output and stop of a pulse signal 111 for the voltage having the positive polarity (positive bias), output and stop of a pulse signal 112 for the voltage having the negative polarity (negative bias), output and stop of a PWM signal 113, change of DUTY, and detection of a current detection signal 114. The CPU 110 performs output and control of the PWM signal which will be described below and the pulse signal output to the driving circuit on the basis of a control program stored in a ROM (not illustrated). According to the present exemplary embodiment, the polarity of the toner 7 is the negative polarity. In addition, the voltage having the positive polarity when the toner image is transferred to the recording material 9 is set as a voltage having a predetermined polarity, and the voltage having the negative polarity when the transfer roller 10 is cleaned is set as a voltage having a polarity (negative polarity) reverse to the predetermined polarity. A driving circuit 121 is a circuit configured to drive a transformer 101 for the positive bias. The pulse signal 111 is received, and the AC voltage is applied to a primary side of the transformer 101. A high AC voltage obtained by boosting the AC voltage on the primary side is generated on a secondary side of the transformer 101 and smoothed by a diode 102 and a capacitor 103 to become the DC voltage. A bleeder resistance (resistance element) 106 is also arranged. The generated positive voltage (positive bias) is supplied to an output port 104 via a protective resistance 107. When the pulse signal 111 is output or stopped, it is possible to output or stop the positive bias. A load 105 (the transfer roller 10) is also arranged. A driving circuit 122 is a circuit configured to drive the transformer 131 for the negative bias. The pulse signal 112 is received, and the AC voltage is applied to a primary side of the transformer 131. A high AC voltage obtained by boosting the AC voltage on the primary side is generated on a secondary side of the transformer 131 and smoothed by a diode 132 and a capacitor 133 to become the DC voltage. A bleeder resistance (resistance element) 136 is also arranged. The generated negative voltage (negative bias) is supplied to the output port 104 via the bleeder resistance 106 and the protective resistance 107. When the pulse signal 112 is output or stopped, it is possible to output or stop the negative bias voltage. It should be noted that a circuit constituted by the driving circuit 121, the transformer 101, the diode 102, the capacitor 103, and the bleeder resistance 106 is a high-voltage generation unit configured to generate the positive voltage. In addition, a circuit constituted by the driving circuit 122, the transformer 131, the diode 132, the capacitor 133, and the bleeder resistance 136 is a high-voltage generation unit configured to generate the negative voltage.

The PWM signal 113 is a signal with which. DUTY can be changed between 0% and 100%. A voltage control circuit 123 is connected to a reference voltage V1. The voltage control circuit 123 receives the PWM signal 113 and supplies a voltage in accordance with the DUTY of the PWM signal 113 to the primary side of the transformer 101 for the positive bias and the transformer 131 for the negative bias. The supplied voltage is used for driving the transformer 101 and the transformer 131. That is, while the DUTY of the PWM signal 113 is changed, it is possible to change an output level of each of the positive bias and the negative bias. A hexadecimal number or a decimal number is used as a setting value of the DUTY of the PWM signal 113 inside the CPU 110. For example, in a case where 8-bit data is used, DUTY 0% to 100% is dealt with a value of (00)16 to (FF)16 or (0)10 to (255)10. A current detection circuit 124 is a circuit configured to detect a current flowing through the load 105 (the transfer roller 10). The current detection signal 114 is an analog voltage in accordance with the current flowing through the load 105. When the current is high, the voltage is increased, and when the current is low, the voltage is decreased. The current detection signal 114 is transmitted to an analog-to-digital (A/D) conversion port of the CPU 110 and dealt with a value of (00)16 to (FF)16 or (0)10 to (255)10 in the case of the 8-bit data inside the CPU 110.

Figure 4:
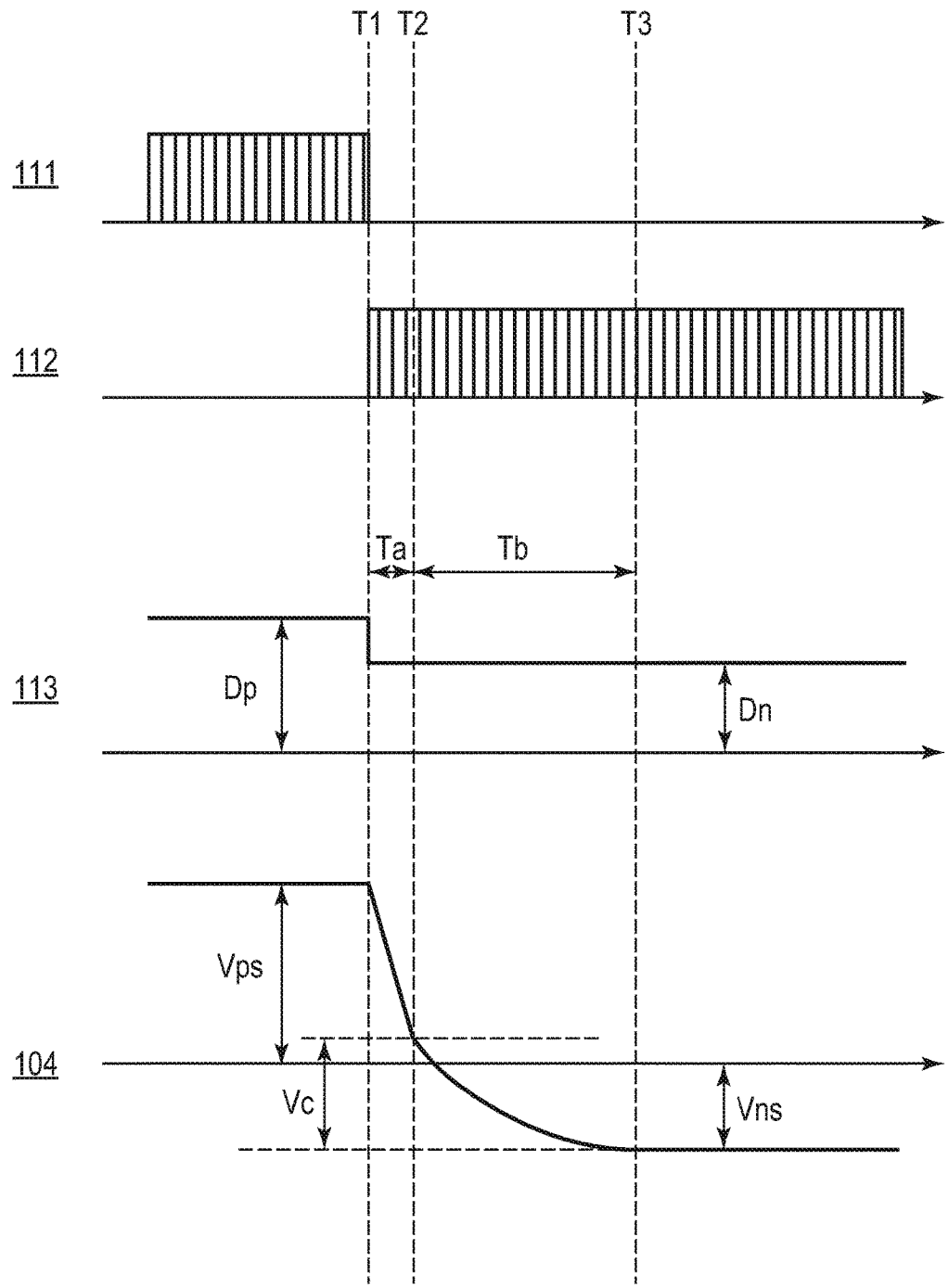
FIG. 4 is a timing chart according to a related art.

Next, descriptions will be given of control of the voltage applied to the transfer roller 10 when the trailing edge of the recording material 9 passes through the transfer nip portion after the image is transferred to the recording material 9 in contrast with the related art. FIG. 4 and FIG. 5 respectively illustrate timing charts of the PWM signal and the output voltage in a transition period from a state in which the positive voltage is generated to a state in which the negative voltage is generated according to the related art and the present exemplary embodiment. FIG. 4 is a timing chart according to the related art, and FIG. 5 is a timing chart according to the present exemplary embodiment, illustrating ON/OFF of the pulse signal 111 for the positive bias and the pulse signal 112 for the negative bias, a DUTY setting value of the PWM signal 113, and a voltage waveform of the output port 104. It should be noted that a direction in which an absolute value is increased is represented as "rising", and a direction in which an absolute value is decreased is represented as "trailing" with regard to both the positive bias and the negative bias in the explanation. First, the control in the related art will be described with reference to FIG. 4.

A timing T1 in FIG. 4 is a timing when the pulse signal 111 for the positive bias is turned off, and the pulse signal 112 for the negative bias is turned on and also a timing when the switching from the positive bias to the negative bias is started. The timing T1 is a timing after a predetermined time from a timing when the TOP signal detects the trailing edge of the recording material 9 and is controlled such that the CPU 110 performs the switching from the positive bias to the negative bias at an optimal timing. The DUTY setting value of the PWM signal 113 is set as Dp, which corresponds to the DUTY setting value of the positive bias during a period before the timing T1. The voltage of the output port 104 at that time is set as Vps. A period Ta from the timing T1 to a timing T2 is a period in which a rectified voltage of the negative bias (voltage of the capacitor 133) rises, and the voltage of the output port 104 changes to a negative side at a predetermined slope. A period Tb from the timing T2 to a timing T3 is a period in which the voltage of the output port 104 rises to the target voltage Vns of the negative bias at a time constant determined by a resistance inside the circuit and resistance values of the capacitor and the load 105. At the timing T1 in the control in the related art, the value is switched to a DUTY setting value Dn of the PWM signal 113 equivalent to the target voltage in a stationary state of the negative bias. As a result, it takes a time period corresponding to the rising period Ta of the negative bias rectified voltage and the period Tb determined by the above-described time constant until the voltage of the output port 104 becomes the target voltage. Herein, a difference between the voltage of the output port 104 and the target voltage Vns at the timing T2 is set as a correction voltage Vc. In the control in the related art, the trailing edge of the recording material 9 passes through the transfer nip portion during the period Tb, and the transfer nip enters the non-sheet feeding state before the voltage applied to the transfer roller 10 becomes the target voltage Vns. Accordingly, a potential fluctuation (memory) on the photosensitive drum 1 occurs.

On the other hand, the exemplary embodiment of the present invention addresses this issue by performing control of the PWM signal 113 in a manner that the voltage of the output port 104 becomes the target voltage Vns during the period Tb. In addition, the resistance value of the load 105 changes depending on an ambient environment, an operation time, or the like of the image forming apparatus 100 (for example, a rotation time of the transfer roller 10), and accordingly, the correction voltage Vc and the period Tb described above also change. According to the exemplary embodiment of the present invention, the determination on the resistance value of the load 105 (the transfer roller 10) is performed, and the control is carried out such that the switching to the optimal bias can be performed even when the resistance value of the load. 105 changes. A content of the control will be described below with reference to FIG. 5, FIGS. 6A, 6B, and 6C, FIGS. 7A, 7B, and 7C, FIG. 8, and FIG. 9.

First, FIG. 5 is the timing chart for describing the control according to the exemplary embodiment of the present invention. The pulse signal 111 for the positive bias and the pulse signal 112 for the negative bias are similar to those described with reference to FIG. 4. At the timing T1, the DUTY setting value of the PWM signal 113 is switched to a DUTY setting value Dn obtained by adding a DUTY correction value Dc equivalent to the correction voltage Vc to the DUTY setting value Dn. During the period Ta, after the setting value Dn' is maintained, the setting value is gradually switched from. Dn' to Dn from the timing T2 to the timing T3. During the period. Ta and the period Tb, by setting the DUTY setting value that takes into account the rising curve based on the time constant of the circuit described above, the voltage of the output port 104 can be raised to the target voltage Vns from the timing T2.

When this control is executed, the correction value Dc and the period Tb are to be calculated. The correction value Dc and the period Tb can be calculated by using the DUTY setting value of the PWM signal 113 and the value of the current detection signal 114. The calculation expression will be described including the calculation process.

Figure 6A:
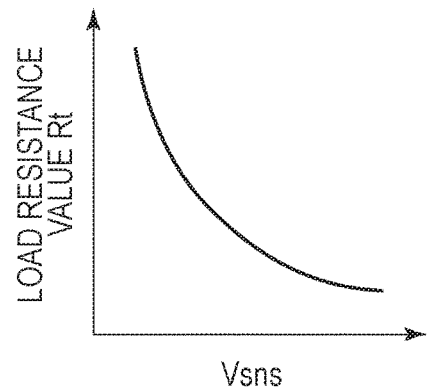
FIG. 6A is a graphic representation illustrating a relationship between a detection voltage (Vsns) and a load resistance value (Rt)

In a case where the positive bias is output at a predetermined DUTY setting value of the PWM signal 113, the voltage of the current detection signal 114 becomes a low voltage since the flowing current is small when the resistance value of the load 105 is high, and the voltage becomes a high voltage since the flowing current is large the resistance value of the load 105 is low. A digital value of the current detection signal 114 obtained by the CPU 110 is set as Vsns, and the resistance value of the load 105 is set as Rt, a characteristic of FIG. 6A is obtained and can be approximated by Expression (1) below.

$$R_t = a_1 V_{sns}^{n1} \quad (1)$$

Where a1 and n1 are fixed values.

When the DUTY setting value of the PWM signal 113 is set as D, and the positive bias applied to the load 105 is set as Vp, a characteristic of Vp where the DUTY setting value D is set as a variable becomes FIG. 6B and can be approximated by Expression (2) below. When an absolute value of the negative bias voltage applied to the load 105 is set as Vn, a characteristic of Vn where the DUTY setting value D is set as a variable can be similarly approximated by Expression (3) below.

$$V_p = S_p D \quad (2)$$

$$V_n = S_n D \quad (3)$$

Figure 6B:
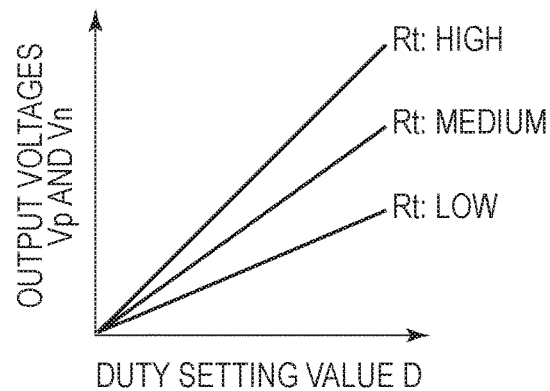
FIG. 6B is a graphic representation illustrating a relationship between a DUTY setting value and output voltages (Vp and VU), and FIG. 60' is a graphic representation of the load resistance value (Rt) and slopes (Sp and Sn).
Figure 6C:
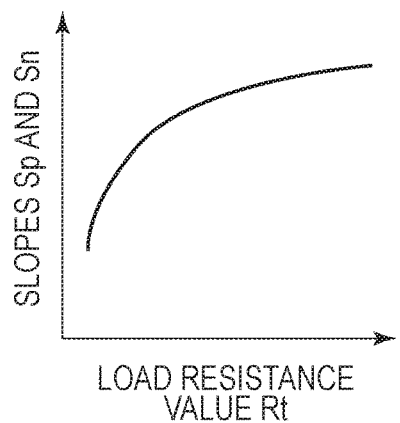

Sp and Sn are slopes of the graphic representation of FIG. 6B and are resolutions of Vp and Vn (amounts of change of Vp and Vn when the DUTY setting value D is changed by "1"). The slopes Sp and Sn change on the basis of the value of the load resistance value Rt. When Rt is large, the slopes Sp and Sn are also large. When Rt is small, the slopes Sp and Sn are also small. The slopes Sp and Sn and the load resistance value Rt have a characteristic illustrated in FIG. 6C and can be approximated by Expressions (4) and (5) below.

$$S_p = a_p R_t^{np} \quad (4)$$

$$S_n = a_n R_t^{nn} \quad (5)$$

Where ap, np, an, and nn are fixed values.

From Expressions (1) to (5) described above, the following expressions are obtained.

$$V_p = S_p D = a_p R_t^{np} D = a_p (a_1 V_{sns}^{n1})^{np} D = a_p^{a1np} V_{sns}^{n1np} D$$

$$V_p = a V_{sns}^{m} D \quad (6)$$

*a=$a_p a_1^{np}$ m=$n_1 n_p$ $$V_n = S_n D = a_n R_t^{nn} D = a_n (a_1 V_{sns}^{n1})^{nn} D = a_n a_1^{nn} V_{sns}^{n1nn} D$$

$$V_n = b V_{sns}^{n} D \quad (7)$$

*b=$a_n a_1^{nn}$ n=$n_1 n_n$

Where a, b, m, and n are fixed values.

From Expressions (6) and (7) described above, the positive bias output voltage Vp and the absolute value Vn of the negative bias output voltage can be calculated on the basis of the DUTY setting value D of the PWM signal 113 and the digital value Vsns of the current detection signal 114.

Figure 7A:
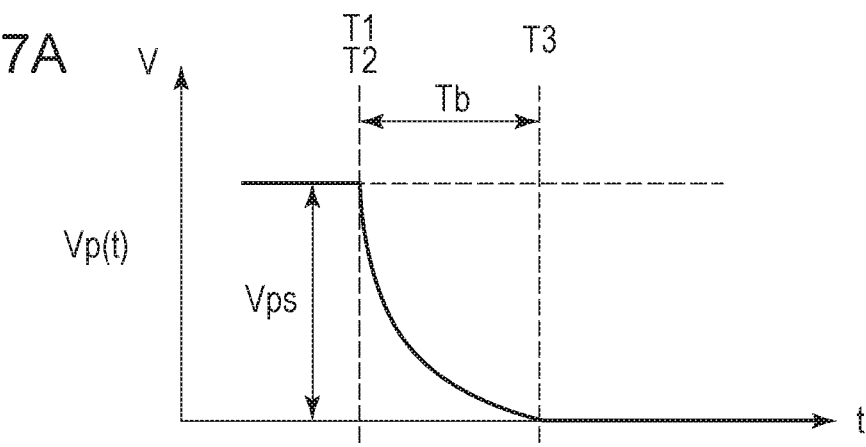
FIGS. 7A, 7B, and 7C are explanatory diagrams for describing a voltage waveform of the transfer power supply.
Figure 7B:
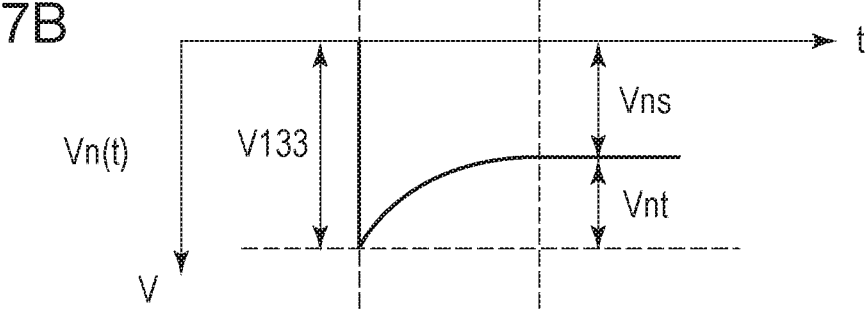

Next, the process leading to the calculation expression for calculating the correction value Dc and the period Tb by using the positive bias Vp and the absolute value Vn of the negative bias will be described. First, descriptions will be given of the correction value Dc. FIGS. 7A, 7B, and 70 are explanatory diagrams for describing the voltage waveform of the output port 104 described with reference to FIG. 4. Since the period from the timing T1 to the timing T2 is shorter than the period from the timing T2 to the timing T3, and the period in which the control corresponding to the feature of the exemplary embodiment of the present invention is performed is the period from the timing T2 to T3, the period from the timing T1 to the timing T2 is omitted. The voltage of the output port 104 is set as Vout. The output voltage Vout is separately considered in terms of a positive bias component and a negative bias component applied to the load 105. FIG. 7A illustrates a waveform of the output voltage of the positive bias component applied to the load. 105 from the timing T1 to the timing T3. With regard to the output voltage of the positive bias component, a function of a time t in which the timing T1 and the timing T2 are set as t=0 is represented by Expression (8) below.

$$V_p(t) = V_{ps} e^{-\frac{t}{R_1 c_p}} \quad (8)$$

$$*R_1 = r_p \,//\, (R_t + r_n)$$

The respective symbols in the above-described expression are as follows.

Vps: Positive bias output voltage before the timing T1
rp: Resistance value of the bleeder resistance 106 for the positive bias
rn: Resistance value of the bleeder resistance 136 for the negative bias
Cp: Electrostatic capacitance of the smoothing capacitor 103 for the positive bias Vp(t) illustrates a waveform in which the voltage charged in the capacitor 103 is discharged via a path of the bleeder resistance 106 and a path of a serial connection of the load 105 and the bleeder resistance 106 from the timing T1 when the pulse signal 111 is stopped. The resistance value of the protective resistance 107 at the output port 104 is sufficiently lower than the resistance values of the load 105 and the bleeder resistance 106 and is omitted in the calculation.

FIG. 7B illustrates a waveform of the output voltage of the negative bias component applied to the load 105. With regard to the output voltage of the negative bias component, a function of the time t in which the timing T1 and the timing T2 are set as t=0 is represented as Expressions (9) and (10) below.

$$V_n(t) = \left(V_{ns} + V_{nt} e^{-\frac{t}{R_2 c_p}}\right) \quad (9)$$

$$*R_2 = r_p \,//\, R_t$$

$$V_{nt} = \frac{r_p}{R_t} V_{ns} \quad (10)$$

When the rectified voltage having the negative bias is set as V133, Vn(t) is a step response of the input voltage V133 in a parallel connection of the smoothing capacitor 103 for the positive bias and the bleeder resistance 106 having the positive bias and a circuit of the load 105 connected in series to the parallel connection circuit. When a voltage of a difference between V133 and Vns is set as Vnt, a relation between Vnt and Vns becomes Expression (10) described above. The resistance value of the protective resistance 107 of the output port 104 is sufficiently low as compared with the resistance value of the load 105 and is therefore omitted in the calculation.

Figure 7C:
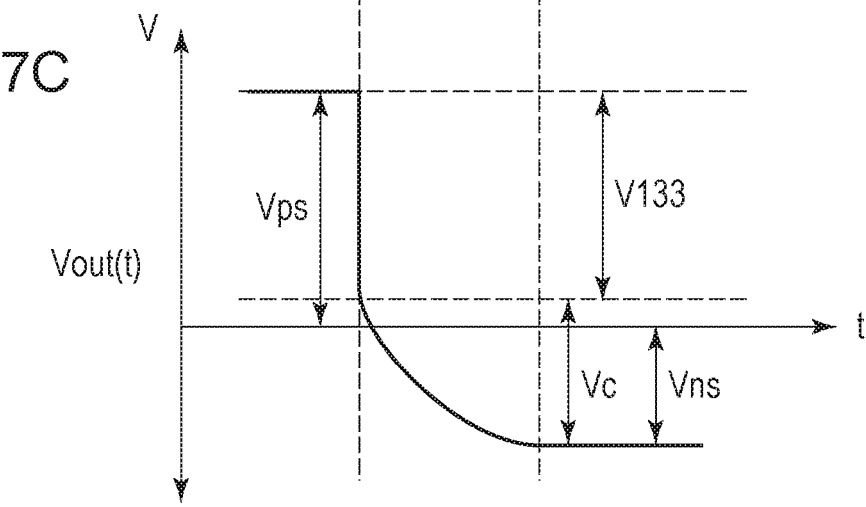

FIG. 7C illustrates a waveform of the output voltage bout applied to the load 105. The waveform can be obtained by combining the output voltage Vp(t) of the positive bias component with the output voltage Vn(t) of the negative bias component. The waveform can be represented by Expression (11) below from. Expression (8) and Expression (9).

$$V_{out}(t) = V_p(t) + V_n(t) \quad (11)$$

$$V_{out}(t) = V_{ps} e^{-\frac{t}{R_1 c_p}} - \left(V_{ns} + V_{nt} e^{-\frac{t}{R_2 c_p}}\right)$$

Since the correction voltage Vc is a difference between the target voltage Vns and the output voltage Vout at t=0, the correction voltage Vc can be represented by Expression (12) below.

$$V_c = V_{ns} + V_{out}(0) \quad (12)$$

$$V_c = V_{ns} + V_{ps} - (V_{ns} + V_{nt})$$

$$V_c = V_{ps} - V_{nt}$$

$$V_c = V_{ps} - \frac{r_p}{R_t} V_{ns}$$

The DUTY setting value Dc equivalent to the correction voltage Vc can be calculated by using Expression (7).

$$V_n = b V_{sns}^n D$$

$$D_c = \frac{1}{b V_{sns}^n} V_c$$

From Expressions (12), (6), and (7), the following expression is obtained.

$$D_c = \frac{1}{b V_{sns}^n} V_c \quad (13)$$

$$D_c = \frac{1}{b V_{sns}^n} \left(V_{ps} - \frac{r_p}{R_t} V_{ns}\right)$$

$$D_c = \frac{1}{b V_{sns}^n} \left(a V_{sns}^m D_p - \frac{r_p}{R_t} b V_{sns}^n D_n\right)$$

The respective symbols in Expression (13) described above are as follows.
Dp: DUTY setting value equivalent to Vps
Dn: DUTY setting value equivalent to Vns Rt can be calculated from Expression (1). Therefore, it is possible to calculate the correction value Dc of the DUTY setting value by using the DUTY setting values Dp and Dn of the PWM signal 113 and the digital value Vsns of the current detection signal 114 from Expression (13).

Next, the period Tb will be described. When the period Tb is set as a time period when a difference between the output voltage Vout and the target voltage Vns becomes the resolution Sn of the negative bias, the period Tb is obtained from Expression (11).

$$V_{out}(T_b) + V_{ns} = S_n$$

$$V_{ps} e^{-\frac{T_b}{R_1 c_p}} - \left(V_{ns} + V_{nt} e^{-\frac{T_b}{R_2 c_p}}\right) + V_{ns} = S_n$$

$$V_{ps} e^{-\frac{T_b}{R_1 c_p}} - V_{nt} e^{-\frac{T_b}{R_2 c_p}} = S_n$$

To simplify the calculation, exponent parts of e are matched with each other. The exponent parts are matched in terms of R2 having a value lower than a value of R1.

$$(V_{ps} - V_{nt})e^{-\frac{T_b}{R_2 c_p}} = S_n$$

$$e^{-\frac{T_b}{R_2 c_p}} = \frac{S_n}{V_{ps} - V_{nt}}$$

$$-\frac{T_b}{R_2 c_p} = \ln\left(\frac{S_n}{V_{ps} - V_{nt}}\right)$$

$$T_b = -R_2 c_p \ln\left(\frac{S_n}{V_{ps} - V_{nt}}\right)$$

From Expression (5), (6), and (7), the following expression is obtained.

$$T_b = -R_2 c_p \ln\left(\frac{S_n}{V_{ps} - V_{nt}}\right) \quad (14)$$

$$T_b = -R_2 c_p \ln\left(\frac{a_n R_t^{r_n}}{a V_{sns}^m D_p - b V_{sns}^n D_n}\right)$$

Rt can be calculated from Expression (1). Therefore, it is possible to calculate the period Tb of the DUTY setting value by using the DUTY setting values Dp and Dn of the PWM signal 113 and the digital value Vsns of the current detection signal 114 from Expression (14).

Figure 8:
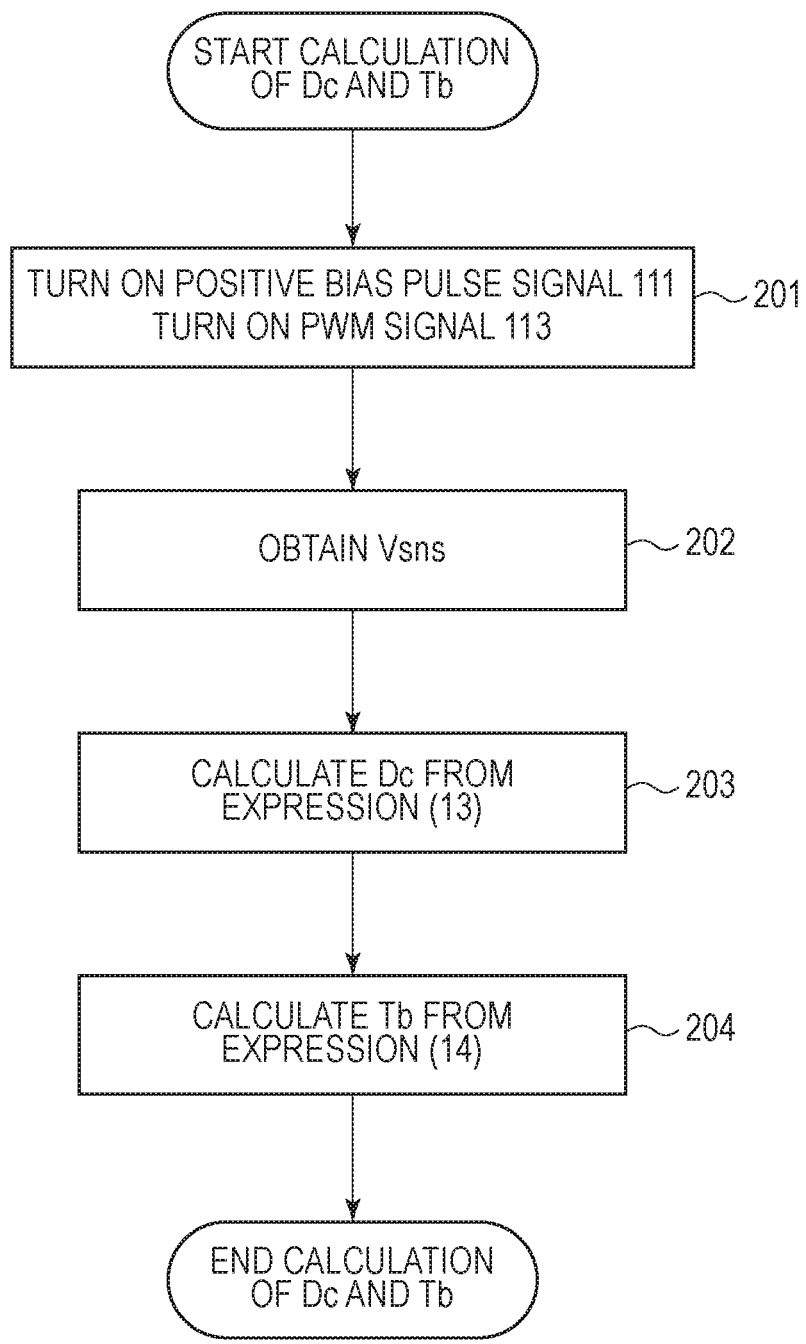
FIG. 8 is a flow chart for calculating a correction value (Dc) and a period (Tb).

With reference to FIG. 8, descriptions will be given of the calculation flow of the correction value Dc of the DUTY setting value and the period Tb. In 201 of FIG. 8, the pulse signal 111 for the positive bias is turned on, and the PWM signal 113 is turned on, so that the positive bias is output. In 202, the CPU 110 obtains the current detection digital value Vsns. In 203, the correction value Dc, is calculated from Expression (13), and in 204, the period Tb is calculated from Expression (14). Thus, the calculation of the correction value Dc and the period Tb is ended. This flow is performed in a stage before the switching control from the transfer positive bias to the negative bias which will be described with reference to FIG. 9 is performed such as the time of pre-rotation before image formation.

Figure 9:
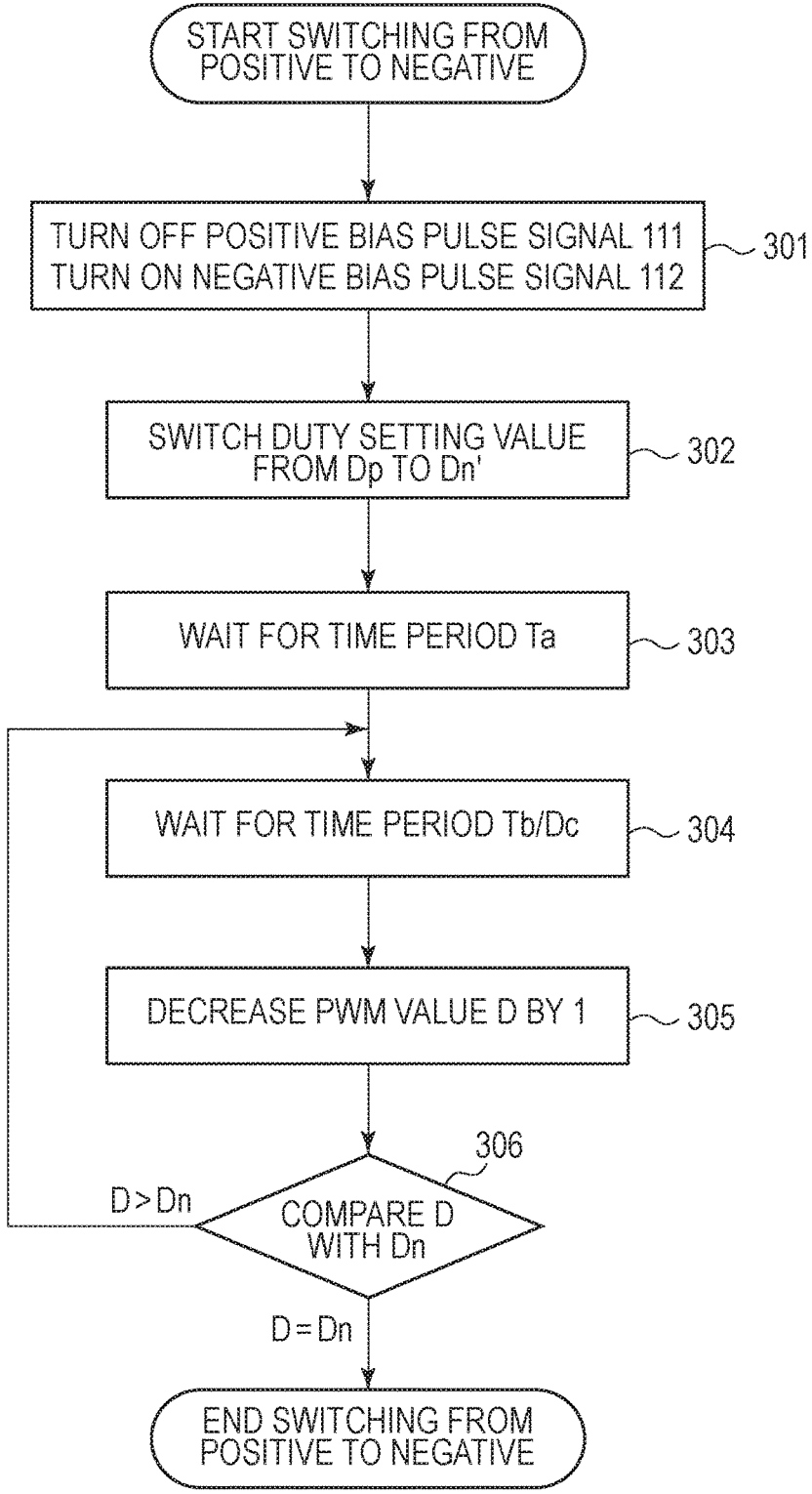
FIG. 9 is a flow chart for switching a transfer bias from a positive bias to a negative bias.

With reference to FIG. 9, descriptions will be given of the flow of the switching operation from the positive bias to the negative bias which is performed when the trailing edge of the recording material 9 passes through the transfer nip portion. In 301 of FIG. 9, the pulse signal 111 for the positive bias is turned off, and the pulse signal 112 for the negative bias is turned on. In 302, the DUTY setting value D of the PWM signal 113 is switched from Dp to Dn'. Dn' is a value obtained by adding the correction value Dc calculated in the flow of FIG. 8 to the DUTY setting value Do equivalent to the target voltage Vns of the negative bias. In 303, the flow stands by for the period Ta in which the negative rectified voltage rises. In 304, the flow stands by for a time period Tb/Dc. The time period Tb/Dc is a value calculated from the value calculated in the flow of FIG. 8. In 305, the PWM setting value D is decreased by 1. In 306, the PWM setting value D is compared with the DUTY setting value Dn equivalent to the target voltage Vns. When D>Dn is established, the flow returns to 304, and 305 and 306 are repeated. When D=Dn is established, the switching operation of the transfer positive bias to the negative bias is ended. According to the present exemplary embodiment, the control has been described in which the DUTY setting value D of the PWM signal 113 is changed by 1 at a time for every the time period Tb/Dc, but the amount of change of the DUTY setting value D and the time interval for the change are not limited to the above. The control can be changed within a voltage range allowed by the drum memory.

By adopting the above-described configuration, it is possible to provide the high-voltage power supply apparatus that shortens the time period used for the polarity switching of the output voltage by using the simple configuration. In addition, it is possible to perform the polarity switching control of the output voltage in response to the change of the resistance value of the transfer roller 10.

Moreover, the circuit illustrated in FIG. 3 according to the present exemplary embodiment controls the DUTY setting value D without the provision of a circuit configured to detect an output voltage for feeding back as one of the features. In the configuration in the related art, the output voltage is detected, and the control is performed on the basis of the detected voltage. Thus, the number of circuit components is increased, and the miniaturization of a substrate size of the power supply circuit has a limit. According to the present exemplary embodiment, the circuit controls the DUTY setting value D irrespective of the change of the output voltage, and the substrate size can be further reduced. In addition, the resistance element for the detection is connected on the secondary side of the transistor as the circuit configured to perform the voltage detection, and the maximum output performance is decreased by this resistance element. According to the present exemplary embodiment, since the voltage detection circuit is absent, the maximum output performance can be improved as compared with the circuit in the related art. Furthermore, reduction in the costs can also be realized since the voltage detection circuit is absent.

It should be noted that the circuit according to the present exemplary embodiment includes the current detection circuit configured to detect the load fluctuation, but the current detection circuit may be omitted in a case where the load fluctuation of the output voltage supply target is small, and it is possible to realize a further simplified configuration.

Second Exemplary Embodiment

The resistance value of the transfer roller 10 changes depending on the ambient environment or the operation time. When the resistance value of the transfer roller 10 changes, the correction voltage Vc and the period Tb described in the first exemplary embodiment also change. According to the present exemplary embodiment, a configuration will be described in which the load resistance value Rt is determined on the basis of the information related to the temperature sensor and the degradation state of the transfer roller 10, and the switching control from the positive bias to the negative bias is performed by using the result.

Figure 10:
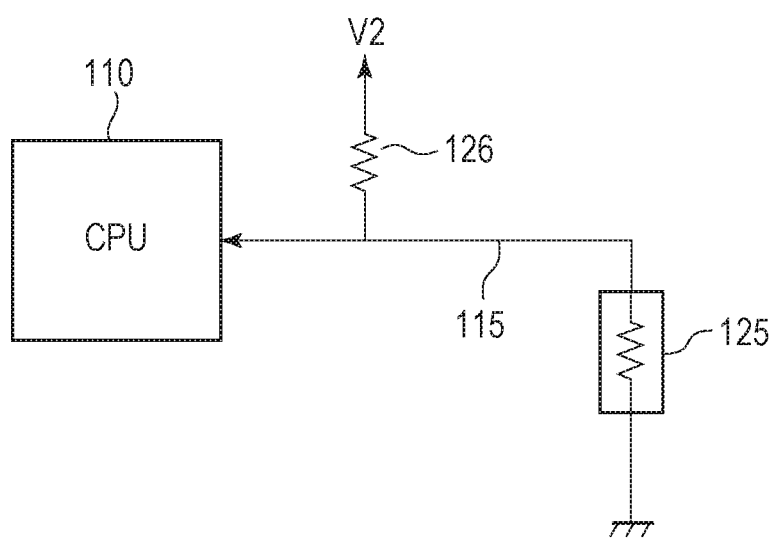
FIG. 10 illustrates an example of a circuit including a temperature sensor unit.

With regard to FIG. 1, FIG. 2, FIG. 3, FIG. 4, FIG. 5, and FIGS. 7A, 7B, and 7C, descriptions are similar to those according to the first exemplary embodiment, and the descriptions thereof will be omitted. FIG. 10 is a circuit diagram of the temperature sensor according to the present exemplary embodiment. The temperature sensor 125 is arranged in a position where the ambient temperature of the image forming apparatus 100 can be detected. For example, the temperature sensor 125 is arranged in the vicinity of an intake fun (not illustrated) or the like. The temperature sensor 125 is connected to a pull-up resistance 126 (resistance element), and the pull-up resistance 126 is connected to a voltage power supply 72. A resistance value of the temperature sensor 125 changes depending on the ambient temperature. Since a voltage level of a temperature sensor signal 115 changes, the CPU 110 can detect the ambient temperature.

FIG. 11A illustrates table information of the load resistance value Rt (which will be hereinafter referred to as a table) stored in a ROM or the like in the CPU 110. Rt1 to Rt5 denote predetermined numeric values. A determination is made on which mode is relevant among five modes Rt1 to Rt5 on the basis of the ambient temperature and the degradation state of the transfer roller 10. H, N, and L on the vertical axis represent the ambient temperatures, representing H (high temperature), N (normal temperature), and L (low temperature) in a descending order. Predetermined thresholds are set with regard to detection results of the temperature sensor signal 115 to determine H, N, or L. The horizontal axis represents degradation states of the transfer roller 10, which are categorized into three stages including an early stage, a middle stage, and a late stage. The determination on whether the degradation state is in the early stage, the middle stage, or the late stage is performed by setting predetermined thresholds to information on the durability limit number of sheets which is recorded in the CPU 110 (the accumulative number of sheets on which images have been formed from the use early stage). For example, in a case where the ambient temperature is determined as N and the durability condition is determined as the middle stage, Rt3 is obtained. FIG. 11B illustrates a table representing the correction value Dc and the period Tb corresponding to each Rt determined in FIG. 11A. For example, in a case where Rt3 is determined in the table of FIG. 11A, Dc3 and Tb3 are used to perform the control. Predetermined numeric values are stored in Dc1 and Th1 to Dc5 and Tb5.

From the tables of FIGS. 11A and 11B, the correction value Dc and the period Tb in accordance with the ambient temperature and the degradation state of the transfer roller 10 are determined to perform the switching control from the positive bias to the negative bias. This determination is performed in a stage before the switching control from the positive bias to the negative bias is actually performed, such as the time of the pre-processing (which will be also referred to as the time of the pre-rotation) before the operation of the image formation is performed, for example. Thereafter, on the basis of the flow chart of FIG. 9 according to the first exemplary embodiment, the correction value Dc and the period Tb in the tables of FIGS. 11A and 11B are used to perform the switching control from the positive bias to the negative bias when the trailing edge of the recording material 9 passes through the transfer nip portion.

By adopting the above-described configuration, it is possible to provide the high-voltage power supply apparatus that shortens the time period used for the polarity switching of the output voltage by using the simple configuration. In addition, it is possible to performed the polarity switching control of the output voltage corresponding to the change of the load resistance value Rt caused by the ambient temperature change of the image forming apparatus 100, the degradation state of the transfer roller 10, or the like.

It should be noted that the switching operation from the positive bias to the negative bias has been described according to the above-described exemplary embodiments, but the control described above can be also applied to the switching operation from the negative bias to the positive bias.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application. No. 2015-144360, filed Jul. 21, 2015, which is hereby incorporated by reference herein in its entirety.

What is claimed is:

1. A high-voltage power supply apparatus comprising:
a first high voltage generation unit configured to output a first high voltage having a predetermined polarity;
a second high voltage generation unit connected to the first high voltage generation unit and configured to output a second high voltage having a polarity reverse to the polarity of the first high voltage; and
a control unit configured to control the first high voltage generation unit and the second high voltage generation unit in a manner that the first high voltage and the second high voltage are selectively output,
wherein the control unit controls an ON time of a pulse signal for adjusting a voltage to be output to the first high voltage generation unit or the second high voltage generation unit so as to control the first high voltage output from the first high voltage generation unit or the second high voltage output from the second high voltage generation unit, and
wherein, during a transition period from a state in which the first high voltage is output is switched to a state in which the second high voltage is output, the control unit changes the ON time of the pulse signal from a first value to a second value smaller than the first value.

2. The high-voltage power supply apparatus according to claim 1, wherein the control unit stops the output of the first high voltage from the first high voltage generation unit during the transition period and starts the output of the second high voltage from the second high voltage generation unit.

3. The high-voltage power supply apparatus according to claim 1, further comprising:
a setting unit configured to set the setting value of the second high voltage output from the second high voltage generation unit,
wherein, during the transition period, the control unit sets the setting value as the setting value in accordance with the voltage higher than the target voltage of the second high voltage and thereafter sets a value to be gradually lower towards the setting value in accordance with the target voltage as the setting value.

4. The high-voltage power supply apparatus according to claim 1, further comprising:
a current detection unit configured to detect a current flowing through a load to which the first high voltage or the second high voltage is supplied,
wherein the setting value and the transition period are changed by using a detection result of the current detection unit.

5. An image forming apparatus comprising:
an image forming unit; and
a high-voltage power supply configured to output a high voltage to the image forming unit,
the high-voltage power supply including
a first high voltage generation unit configured to output a first high voltage having a predetermined polarity,
a second high voltage generation unit connected to the first high voltage generation unit and configured to output a second high voltage having a polarity reverse to the polarity of the first high voltage, and
a control unit configured to control the first high voltage generation unit and the second high voltage generation unit in a manner that the first high voltage and the second high voltage are selectively output, wherein the control unit controls an ON time of a pulse signal for adjusting a voltage to be output to the first high voltage generation unit or the second high voltage generation unit so as to control the first high voltage output from the first high voltage generation unit or the second high voltage output from the second high voltage generation unit, and wherein, during a transition period from a state in which the first high voltage is output is switched to a state in which the second high voltage is output, the control unit changes the ON time of the pulse signal from a first value to a second value smaller than the first value.

6. The image forming apparatus according to claim 5, wherein the control unit stops the output of the first high voltage from the first high voltage generation unit during the transition period and starts the output of the second high voltage from the second high voltage generation unit.

7. The image forming apparatus according to claim 5, further comprising:
a setting unit configured to set the setting value of the second high voltage output from the second high voltage generation unit,
wherein, during the transition period, the control unit sets the setting value as the setting value in accordance with the voltage higher than the target voltage of the second high voltage and thereafter sets a value to be gradually lower towards the setting value in accordance with the target voltage as the setting value.

8. The image forming apparatus according to claim 5, further comprising:
an image bearing body on which a toner image is formed,
wherein the image forming unit includes a transfer unit that transfers the toner image formed on the image bearing body to a recording material, and the load to which the first high voltage or the second high voltage is supplied is the transfer unit, and
wherein, when the toner image is transferred to the recording material in a transfer position defined by the image bearing body and the transfer unit, the high-voltage power supply outputs the first high voltage to the transfer unit and outputs the second high voltage to the transfer unit in a state in which the recording material does not exist in the transfer position.

9. The image forming apparatus according to claim 8, further comprising:
a current detection unit configured to detect a current flowing through the transfer unit,
wherein the setting value and the transition period are changed by using a detection result of the current detection unit.

10. The image forming apparatus according to claim 8, further comprising:
a current detection unit configured to detect a current flowing through the transfer unit,
wherein a resistance value of the transfer unit is determined by using a detection result of the current detection unit.

11. The image forming apparatus according to claim 10, further comprising:
a detection unit configured to detect an ambient environment,
wherein a determination unit determines the resistance value of the transfer unit on the basis of the detection result of the detection unit and information related to a state of the transfer unit.

12. The image forming apparatus according to claim 5, wherein the transition period is a period after an image is transferred to a recording material by a transfer unit until a trailing edge of the recording material passes through a transfer position.

* * * * *